United States Patent [19]

Kitajima

[11] Patent Number: 5,066,229
[45] Date of Patent: Nov. 19, 1991

[54] JIG FOR HOLDING DISC BRAKE PADS

[75] Inventor: Masaji Kitajima, Gumma, Japan

[73] Assignee: Akebono Brake Industry Co., Ltd., Tokyo, Japan

[21] Appl. No.: 515,755

[22] Filed: Apr. 30, 1990

[30] Foreign Application Priority Data

May 1, 1989 [JP] Japan .................. 1-50243[U]

[51] Int. Cl.$^5$ .................................... F27B 3/06
[52] U.S. Cl. .................................... 432/160; 432/162; 432/225; 432/253; 34/13.8
[58] Field of Search .................. 432/205, 6, 247, 253; 34/13.8, 14

[56] References Cited

U.S. PATENT DOCUMENTS

| | | | |
|---|---|---|---|
| 1,212,583 | 1/1917 | Tanner | 34/13.8 |
| 1,328,655 | 1/1920 | Fish, Jr. | 34/13.8 |
| 1,677,963 | 7/1928 | Ford | 34/13.8 |
| 2,873,517 | 2/1959 | Wellman | |
| 3,318,014 | 5/1967 | Whitlow | 34/13.8 |
| 3,986,268 | 10/1976 | Koppelman | 34/13.8 |
| 4,199,870 | 4/1980 | Arsenault | 34/13.8 |
| 4,233,752 | 11/1980 | Kleinguenther | 34/13.8 |
| 4,486,173 | 12/1984 | Hieber et al. | 432/205 |

FOREIGN PATENT DOCUMENTS 3628367 2/1987 Fed. Rep. of Germany .
2202582 4/1974 France .
2254984 7/1975 France .

Primary Examiner—Henry C. Yuen
Attorney, Agent, or Firm—Finnegan, Henderson, Farabow, Garrett and Dunner

[57] ABSTRACT

A jig for holding a plurality of disc brake pads during curing of the pads after the heat forming thereof, including, a frame, a pair of hanger shafts, a front support plate, a rear support plate, and a drive mechanism. The frame has a front plate and a rear plate. The hanger shafts extend from the front plate to the rear plate. The front support plate and the rear support plate are slidably fitted on the hanger shafts so that both support plates can be guided by the hanger shafts. Springs are provided between the rear plate and the rear support plate. The drive mechanism includes a gear and a bolt. The gear has teeth on its outside circumferential surface and is rotatably supported by the front plate. When the gear is rotated, the front support plate is pushed toward the rear plate by the bolt, and the pads are interposed in a compressed state between both of the support plates after the heat forming.

17 Claims, 2 Drawing Sheets

JIG FOR HOLDING DISC BRAKE PADS

BACKGROUND OF THE INVENTION

1. Field of the Invention

The present invention relates to a jig for holding a disc brake pad during the curing thereof in manufacturing the pad.

2. Description of the Related Art

In manufacturing, the conventional curing of a disc brake pad is performed after the heat forming of the pad, mainly for the purpose of stabilizing the hardening of the binding agent of the pad. Since the pad is put in a jig and manually tightened by an impact wrench in order to be subjected to the curing, the handling of the pad is inefficient and the tightening force on the pad differs from pad to pad or from jig to jig. For that reason, the quality of the pad subjected to the curing differs from pad to pad.

SUMMARY OF THE INVENTION

The present invention was made in order to solve the above-mentioned problems.

According, it is an object of the present invention to provide a jig for holding a plurality of disc brake pads during curing of the pads, after the heat forming thereof. The jig includes a frame, a pair of hanger shafts, a front support plate, a rear support plate, and a drive mechanism. The frame has a front plate and a rear plate. The hanger shafts extend from the front plate to the rear plate. The front and the rear support plates are slidably fitted on the hanger shafts so that both of the support plates can be guided by the hanger shafts. Springs are provided between the rear plate and the rear support plate. The drive mechanism includes a gear and a bald. The gear has teeth on the outside circumferential surface thereof, and is rotatably supported by the front plate. The front support plate is threadably connected to be pushed toward the rear plate by the bolt when the gear is rotated.

The disc brake pads are interposed in a compressed state between the front and the rear support plates after the heat forming of the pads. After the disc brake pads are placed between the front and the rear support plates, a gear is engaged with the gear of the drive mechanism and rotated. As a result, the threadably connected front support plate is pushed toward the rear plate by the bolt, and the front and the rear support plates are slid, while being guided by the hanger shafts, so that the disc brake pads are tightened. At that time, the springs between the rear plate and the rear support plate are resiliently and elastically compressed so that the rear support plate is resiliently and elastically supported. For that reason, such disc brake pads placed in a large number of such jigs can be tightened to nearly the same degree depending on the driving force of the gear. The jigs are put in an oven for the curing of the disc brake pads After the curing is performed, the jigs are taken out of the oven and the gear is engaged with the gear of the drive mechanism of each of the jigs [and rotated in reverse so as to rotate the gear of the drive mechanism of each of the jigs to untighten the jigs and loosen their grip on the disc brake pads. The disc brake pads in each of the jigs can thus be automatically and efficiently tightened and untightened. Since the pads are tightened to nearly the same degree, the quality of the pads is prevented from differing from pad to pad due to the curing.

A partition plate may be provided between the front and the rear support plates so as to make it possible to interpose a plurality of disc brake pads between the front support plate and the partition plate and another plurality of disc brake pads between the partition plate and the rear support plate.

The gear and bolt of the, drive mechanism may be threadably connected such that rotation of the gear moves the bolt inward or outward relative to the gear through a screw action to push the front support plate toward the rear plate.

The bolt and the front support plate may be threadably connected such that rotation of the gear of the drive mechanism moves the bolt inward or outward relative to the front support plate through a screw action to push the front support plate toward the rear plate.

BRIEF DESCRIPTION OF THE DRAWINGS

The accompanying drawings, which are incorporated in and constitute a part of the specification, illustrate presently preferred embodiments and method of the invention and, together with the general description given above and the detailed description of the preferred embodiments and method given below, serve to explain the principles of the invention. Of the drawings.

DETAILED DESCRIPTION OF THE PREFERRED EMBODIMENTS

Figure 1:
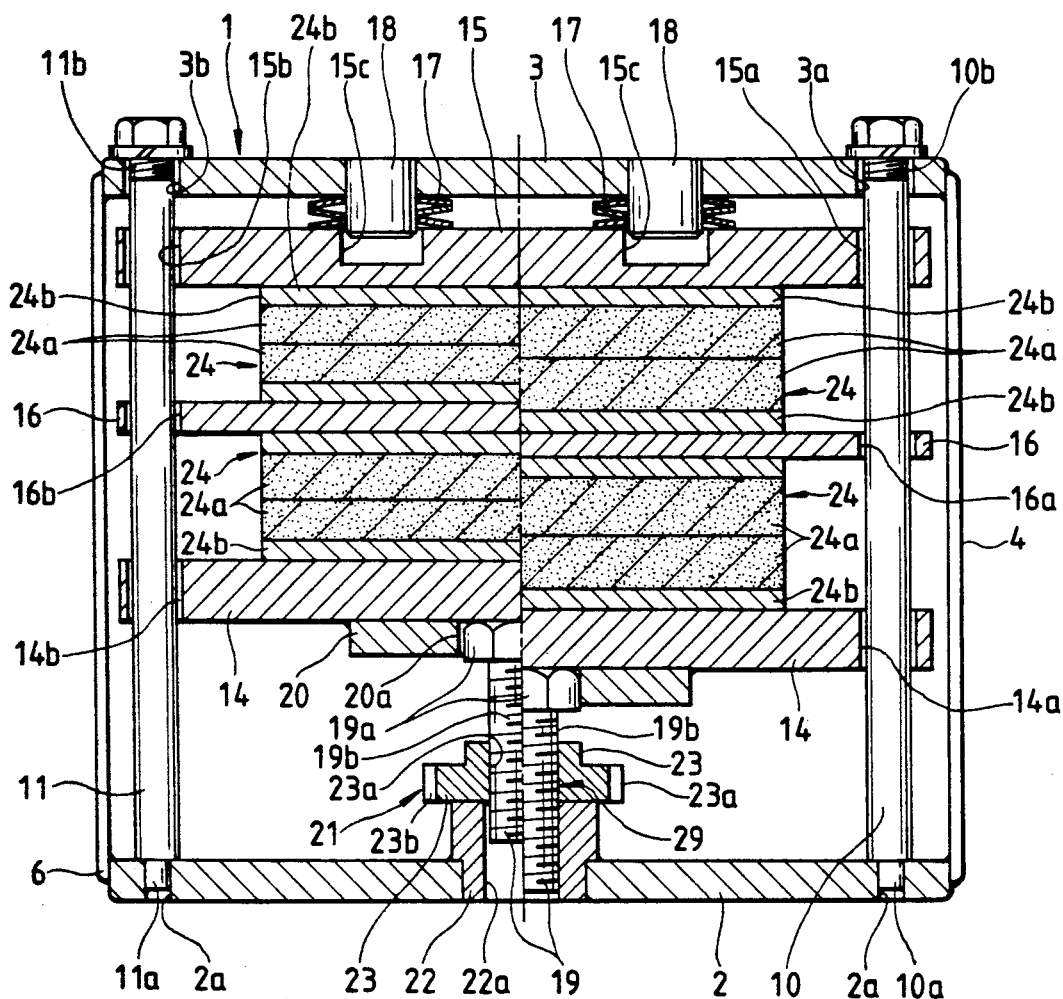
FIG. 1 is a sectional view of a jig in accordance with the present invention.

Reference will now be made in detail to the presently preferred embodiments and method of the invention as illustrated in the accompanying drawings. Wherever possible, like reference characters designate like or corresponding parts throughout the several drawings.

Figure 2:
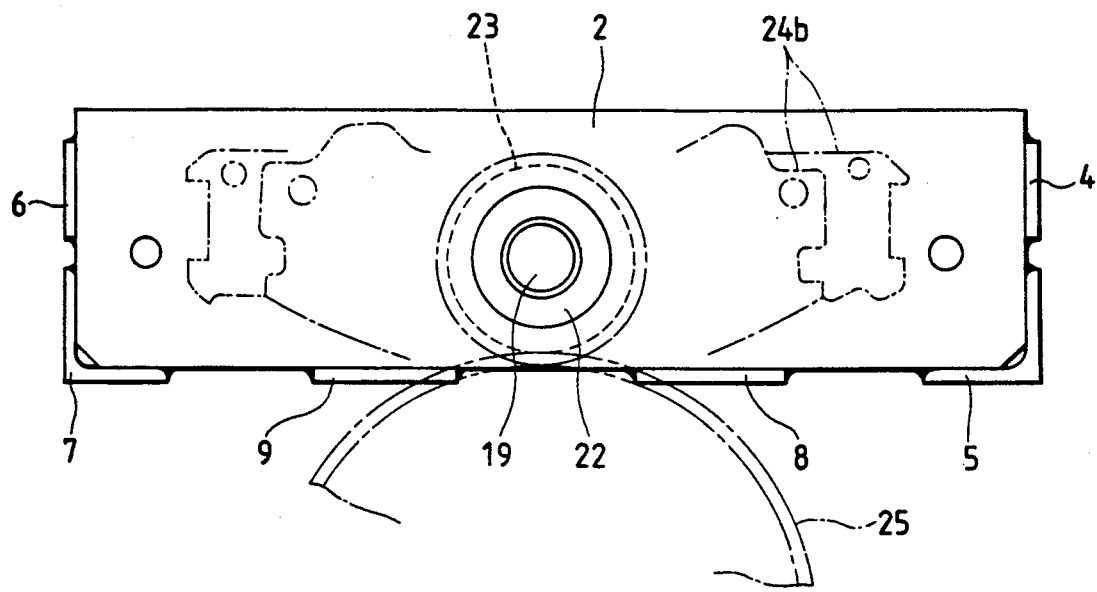
FIG. 2 is a front view of the jig of FIG. 1.

FIGS. 1 and 2 show a jig which is an embodiment of the present invention and is for holding a plurality of disc brake pads 24 during the curing thereof. The jig includes a frame 1, a pair of hanger shafts 10 and 11, a front support plate 14, a rear support plate 15, and a drive mechanism 21. The frame 1 includes a front plate 2, a rear plate 3, side plates 4, 5, 6 and 7, and bottom plates 8 and 9.

The side plates 4, 5, 6 and 7 are welded on the side portions of the front plate 2 and the rear plates 3 so that the contour of the frame 1 is squarely shaped. The bottom plates 8 and 9 are welded on the bottoms of the front plate 2 and the rear plate 3. The pair of hanger shafts 10 and 11 are inserted into the rear plate 3 through the tapped holes 3a and 3b of the rear plate and small-diameter tip portions 10a and 11a of the hanger shafts 10 and 11 are fitted in the holes 2a and 2b of the front plate 2. Bolts 10b and 11b are engaged in the tapped holes 3a and 3b of the rear plate 3 so that the hanger shafts 10 and 11 are prevented from coming off of the front plate 2 and the rear plate 3.

The front support plate 14, the rear support plate 15 and a partition plate 16, which is interposed between the support plates, are slidably fitted on the hanger shafts 10 and 11 so that the plates 14, 15 and 16 can be guided by the hanger shafts 10 and 11. The rear support plate 15 is provided inside the frame 1. The hanger shafts 10 and 11 are slidably fitted in the through holes 15a and 15b of the rear support plate 15, which are provided in both of the side portions of the plate 15. A plurality of plate springs 17 are interposed between the rear support plate 15 and the rear plate 3 and fitted on a pair of support projections 18 provided on the rear plate. The support projections 18 project into recesses 15c in the rear support plate 15 when the plate springs 17 are compressed.

The space between the front support plate 14 and the rear support plate 15 is divided into a plurality of spaces by the partition plate 16 provided inside the frame 1. Through holes 16a and 16b are provided in both of the side portions of the partition plate 16. The hanger shafts 10 and 11 are slidably fitted in the through holes 16a and 16b. The front support plate 14 is provided inside the frame 1. Through holes 14a and 14b are provided in both of the side portions of the front support plate 14. The hanger shafts 10 and 11 are slidably fitted in the through holes 14a and 14b. An attached plate 20 having a hexagonal hole 20a is welded on the front of the front support plate 14. A hexagonal head 19a of a bolt 19 is engaged in the hexagonal hole 20a of the attached plate 20 so that the bolt cannot be rotated relative to the plate.

The drive mechanism 21 is provided between the front plate 2 and the front support plate 14. The drive mechanism 21 includes the bolt 19 and a gear 23. A bearing 22 having a through hole 22a is welded on the central portion of the front plate 2. The bolt 19 having a screw thread 19b is rotatably fitted in the through hole 22a of the bearing 22. As mentioned above, the hexagonal head 19a of the bolt 19 is engaged in the hexagonal hole 20a of the attached plate 20. A screw thread 23a is provided on the inside circumferential surface of the gear 23. The screw thread 23a of the gear 23 is engaged with the screw thread 19b of the bolt 19 so that the bolt 19 and the gear 23 are threadably connected to each other as shown at 29 in FIG. 1. The gear 23 can be rotated on the tip of the bearing 22. Teeth 23b are provided on the outside circumferential surface of the gear 23.

The operation of the jig will now be described. A pair of disc brake pads 24 are placed between the front support plate 14 and the partition plate 16 and another pair of disc brake pads 24 are placed between the rear support plate 15 and the partition plate 16 as the bolt 19 remains sufficiently inserted into the through hole 22a of the bearing 22 as shown in the right-hand portion of FIG. 1. At that time, the friction materials 24a of each pair of disc brake pads 24 are butted against each other. The backing plates 24b of the pair are put on the bottom plates 8 and 9 as shown in FIG. 2 and are butted against the partition plate 16 or the front support plate 14 or the near support plate 15. The frame 1 is thereafter put on a work holder (not shown), so that the teeth 23b of the gear 23 are engaged with a gear 25, which is rotated by a motor (not shown). The bottom plates 8 and 9 have notches have notches so that the bottom plates 8 and 9 do not interfere with the gear 25. The gear 25 is rotated so that the bolt 19 is moved toward the rear plate 3. As a result, the front support plate 14 is pushed toward the rear support plate 15, and the front support plate 14, the partition plate 16 and the rear support plate 15 are slid while being guided by the hanger shafts 10 and 11, so that the disc brake pads 24 are tightened. At that time, the plate springs 17 between the rear plate 3 and the rear support plate 15 are resiliently and elastically compressed so that the rear support plate 15 is resiliently and elastically supported. After that, the gear 25 is rotated by a prescribed driving force so that each of the disc brake pads 24 is further tightened to a prescribed degree. A large number of such disc brake pads can be thus be tightened to the prescribed degree even if a large number of such jigs are used for the pads.

The large number of the jigs with the large number of the disc brake pads tightened therein, as described above, are put in an oven (not shown), and the pads are subjected to curing at a temperature of about 150° C. to about 300° C. for several hours. As a result, the adhesive power is heightened between the friction material 24a and backing plate 24b of each disc brake pad subjected to heat forming before the curing, and the mutual conjoining of the constituents of the friction material is stabilized. The constituents can be a resin as a binding agent, and asbestos or the like since the pads in the jigs are tightened, the pads are prevented from cracking, expanding or the like due to gas generated by the heating of the pads in the oven. After the jigs are taken out of the oven, the gear 25 is engaged with the gear 23 of each of the jigs and then rotated in reverse so as to rotate the gear 23 to move the bolt 19 toward the front plate 2 to untighten the jig and loosen the grip on the disc brake pads 24.

Figure 3:
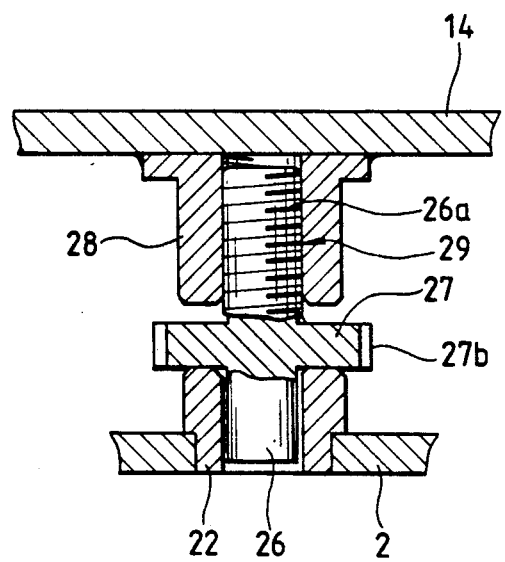
FIG. 3 is a sectional view of a drive mechanism which is a modification of the drive mechanism of the jig of FIG. 1.

FIG. 3 shows a drive mechanism which is a modification of the drive mechanism 21. In the drive mechanism shown in FIG. 3, a gear 27 having teeth 27b is secured to the halfway portion of a bolt 26. A screw thread 26a is provided on the rear half portion of the bolt 26. The front half portion of the bolt 26 is loosely fitted in the bearing 22 of the front plate 2 so that the bolt 26 can be rotated relative to the bearing 22. The front of the gear 27 is in contact with the tip of the bearing 22 so that the gear can be rotated relative to the bearing 22. As shown at 29 in FIG. 3, the bolt 26 is threadably connected to a nut 28 secured to the front support plate 14, so that the bolt 26 is coupled to the front support plate. When the gear 25 is engaged with the teeth 27b of the gear 27 and forwardly rotated, the front support plate 14 is pushed toward the rear support plate 15. When the gear 25 is engaged with the teeth 27b of the gear 27 and reversely rotated, the front support plate 14 is moved back away from the rear support plate 15. Therefore, the drive mechanism shown in FIG. 3 produces nearly the same effect as that shown in FIGS. 1 and 2.

Other embodiments of the invention will be apparent to those skilled in the art from consideration of the specification and practice of the invention disclosed herein. It is intended that the specification and examples be considered as exemplary only. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A jig for holding a disc brake pads during curing thereof, the jig comprising:
   a frame having a front plate and a rear plate;
   a pair of hanger shafts extending between said front plate and said rear plate;
   a front support plate and a rear support plate for supporting brake pads therebetween, the front support plate and the rear support plate being slidably disposed on said hanger shafts and being guided by said hanger shafts;

spring means between said rear plate and said rear support plate for urging the rear support plate toward the front plate; and means mounted on said front support plate for driving said front support plate toward the rear support plate to apply a predetermined compression force to brake pads disposed therebetween, said driving means including a bolt connecting the front support plate to the front plate, and a gear rotatably supported by said front plate and having teeth on the outside circumferential surface thereof, said front support plate being pushed toward said rear plate by said bolt upon rotation of said gear.

2. The jig of claim 1, further comprising a partition plate provided between said front support plate and said rear support plate and slidably on and guided by the hanger shafts.

3. The jig of claim 1, wherein said gear threadably engages said bolt.

4. The jig of claim 1, wherein said bolt threadably engages said front support plate.

5. A jig for holding disc brake pad during curing thereof, the jig comprising:

a frame including a front member and a rer member;

means for contacting at least one disc brake pad, the contacting means including a front support plate and a rear support plate for supporting the at least one disc brake pad therebetween, the front support plate and the rear support plate each being movably disposed in the frame; and means extending between the front member and the front support plate for driving the front support plate toward the rear member.

6. The jig of claim 5, wherein the driving means includes a bolt fixed relative to the front support plate, and a gear rotatable relative to the front support plate, and bolt threadably engaging the gear such that rotation of the gear causes axial movement of the bolt for moving the front support plate toward the rear member.

7. The jig of claim 5, wherein the contacting means further includes means for guiding the front support plate and the rear support plate along a path between the front member and the rear member.

8. The jig of claim 7, wherein the guiding means includes a pair of shafts which extend between the front member and the rear member, the front support plate and the rear support plate being slidably disposed on the shafts.

9. The jig of claim 5, wherein the contacting means further includes a partition plate movably disposed in the frame between the front support plate and the rear support plate for supporting at least one disc brake pad between the front support plate and the partition plate and at least one disc brake pad between the rear support plate and the partition plate.

10. The jig of claim 9, wherein the contacting means further includes means for guiding the front support plate, the partition plate, and the rear support plate along a path between the front member and the rear member.

11. The jig of claim 10, wherein the guiding means includes a pair of shafts which extend between the front member and the rear member, the front support plate, the partition plate, and the rear support plate being slidably disposed on the shafts.

12. The jig of claim 5, wherein the driving means includes a bolt mounted to rotate relative to the front support plate, and a gear fixed relative to the bolt, the bolt threadably engaging the front support plate such that rotation of the gear rotates the bolt for moving the front support plate toward the rear member.

13. The jig of claim 5, comprising a spring disposed between the rear member and the contacting means.

14. The jig of claim 13, wherein the driving means includes a bolt fixed relative to the contacting means, and a rear rotatable relative to the contacting means, the bolt threadably engaging the gear such that rotation of the gear causes axial movement of the bolt for moving the contacting means toward the rear member.

15. The jig of claim 14, wherein the gear includes teeth on an outside circumferential surface thereof.

16. The jig of claim 13, wherein the driving means includes a bolt mounted to rotate relative to the contacting means, and a gear fixed relative to the bolt, the bolt threadably engaging the contacting means such that rotation of the gear rotates the bolt for moving the contacting means toward the rear member.

17. The jig of claim 16, wherein the gear includes teeth on an outside circumferential surface thereof.

* * * * *

UNITED STATES PATENT AND TRADEMARK OFFICE
CERTIFICATE OF CORRECTION

PATENT NO. : 5,066,229
DATED : November 19, 1991
INVENTOR(S) : MASAJI KITAJIMA

It is certified that error appears in the above-identified patent and that said Letters Patent is hereby corrected as shown below:

Claim 1, column 4, line 61, before "disc" insert --plurality of--.

Claim 2, column 5, line 19, after "slidably" insert --disposed--.

Claim 5, column 5, line 25, change "pad" to --pads--.

Claim 5, column 5, line 27, change "rer" to --rear--.

Claim 6, column 5, line 41, before "bolt" change "and" to --the--.

Signed and Sealed this

Fourth Day of May, 1993

Attest:

MICHAEL K. KIRK

Attesting Officer

Acting Commissioner of Patents and Trademarks